Figure 1:
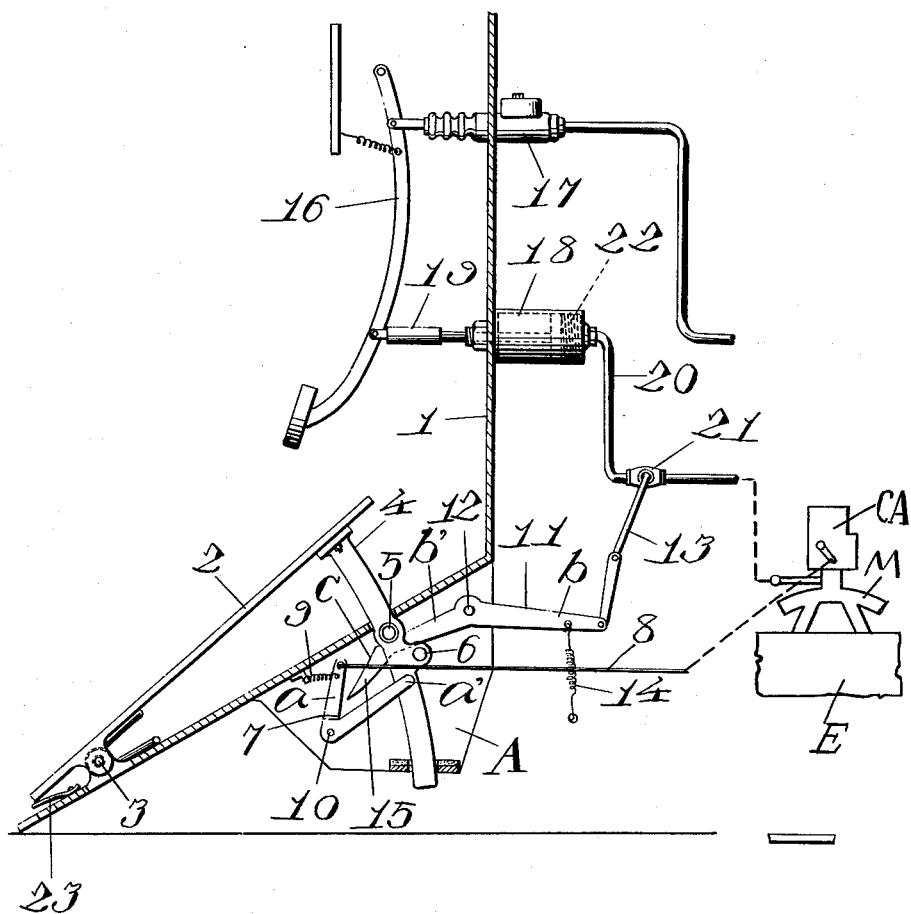

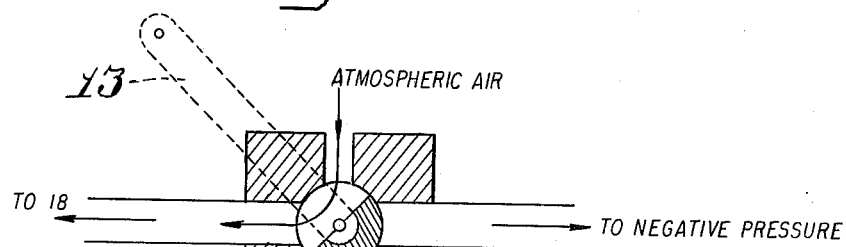
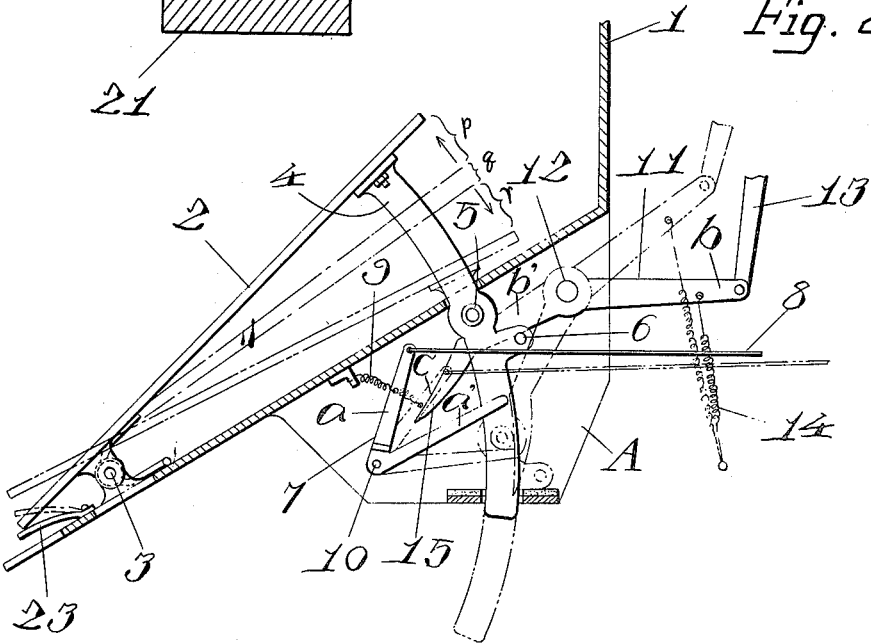
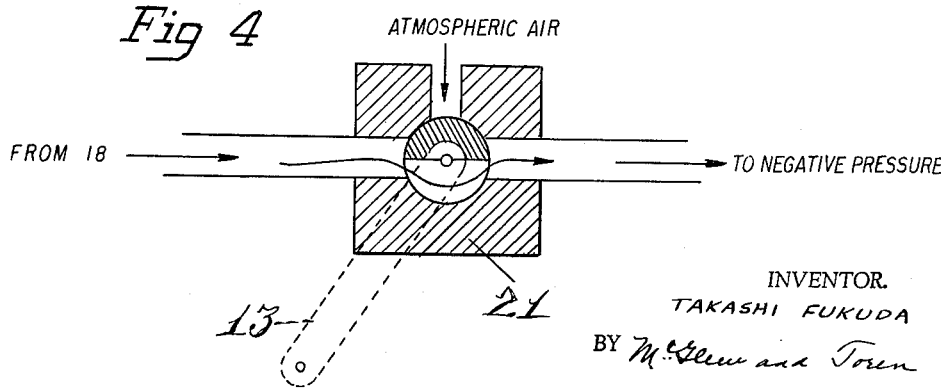

United States Patent Office 3,208,566
Patented Sept. 28, 1965

3,208,566
AUTOMATIC BRAKE MEANS IN COOPERATION WITH THE ACCELERATOR OPERATION OF MOTORCAR
Takashi Fukuda, No. 1 of 266 2-chome, Kiyotaki-cho, Nikko-shi, Tochigi, Japan
Filed Jan. 17, 1963, Ser. No. 252,140
Claims priority, application Japan, Aug. 25, 1962, 37/36,508
1 Claim. (Cl. 192—3)

The present invention relates to an automatic brake means in cooperation with the accelerator control of a motorcar.

An object of the present invention is to supply an automatic brake means in cooperation with the accelerator operation of a motor car, and wherein the brake operation and the accelerator operation are effected by a combined accelerator-brake pedal consisted in combination of the accelerator and brake pedals.

Another object of the present invention is to supply an automatic brake means in cooperation with the accelerator operation of a motor car, and wherein an accelerator-brake pedal, which combines the brake operation and the accelerator operation is movable through three ranges, namely a brake operation range, a neutral range, and an accelerator operation range, dependent on the variation in the angular position of the pedal so that either braking or acceleration may be effected by continual movement of the pedal.

Still another object of the present invention is to supply such an automatic brake means in cooperation with the accelerator operation of a motorcar, wherein said accelerator-brake pedal is provided with a damping device for the brake operation, corresponding to the traveling speed of motorcar so, as to damp the shock at the instant of stopping the motorcar.

Still furthermore, an object of the present invention is to supply an automatic brake means in cooperation with the accelerator operation of a motor car, whereby stopping of the motorcar is performed quickly and accurately by operation of said accelerator-brake pedal without the necessity of shifting of the operator's foot from the accelerator pedal to the brake pedal, thereby avoiding the possibility of accident and minimizing the time required to actuate the brakes in case of emergency. For an understanding of the principles of the invention, reference is made to the following description of a typical embodiment thereof, as illustrated in the accompanying drawing.

In the accompanying drawings illustrating an embodiment of the automatic brake means according to the present invention, FIG. 1 is a side elevation view, partly in section, of the essential part of the automatic brake means according to the present invention, FIG. 2 an enlarged view of a portion of FIG. 1 showing the correlation between the brake operation and the accelerator operation in said accelerator-brake pedal, and FIGS. 3 and 4 are schematic sectional views of a brake power control valve.

Referring to the drawings in detail, an inner frame of the chassis of a motor car is indicated at 1 as having a combined accelerator-brake pedal 2 mounted thereon for pivoting, intermediate its ends, about a pivot axis 3. Pedal 2 is illustrated as having an arcuate extension 4 extending from adjacent its upper or front end through an opening in inner frame 1 and into a mechanism housing A. Intermediate its ends, extension 4 has mounted thereon rotatable pins 5 and 6 which are spaced somewhat from each other longitudinally of extension 4, the pin 5 projecting to both sides of extension 4. A carburetor operating lever 7 is pivotally mounted within the housing A for pivotal movement about a pivot 10, and is illustrated as having one leg *a* to which is secured a rod 8, connected to the carburetor CA and a return spring 9, connected to inner frame 1. Lever 7 has a second leg *a'* which extends to a position wherein it may be engaged by pin or roller 6, on extension 4, upon depression of pedal 2.

A brake operating lever 11 is indicated as pivoted at an axis 12 in housing A, and has a leg *b* to which is articulatedly connected a valve operating rod 13 and a return spring 14. Lever 11 has a second leg *b* which extends between the pins or rollers 5 and 6 and is provided with an idling or neutral portion 15. Neutral portion 15 has an upper edge *c* which is so curved as to form the locus of movement of pin 5 when the latter is in engagement with section 15 so that, when pin 5 is in such engagement with edge surface *c* of portion 15 of lever 11, movement of pedal 2 will not effect any movement whatsoever of brake lever 11.

The usual vehicle brake pedal 16 is indicated as pivotally mounted on the front wall of inner frame 1 and a master cylinder 17 is also mounted on this front wall and is connected to brake lever 16. An automatic brake operating means is indicated at 18 and may suitably be a vacuum pump or cylinder. This vacuum pump serves to operate brake pedal 16 so that the latter need not be operated by the foot of the driver. Vacuum pump 18 is operated by the negative pressure in the intake manifold M leading from the carburetor CA to the engine E, and a piston rod 19 of pump or cylinder 18 is connected to brake pedal 16. A tube or conduit 20 connects pump or cylinder 18 to a valve 21 operated by lever 11 and in turn connected to the intake manifold.

As best seen in FIGS. 3 and 4, valve 21 is a three way valve having a rotary operating member which is operated by the lever 13. One branch of valve 21 is connected through conduit 20 to a device 18, a diametrically opposite branch is connected to the intake manifold of the engine, and a third branch is open to atmosphere. In the position of valve 21 shown in FIG. 3, the device 18 is connected to atmosphere and thus the brake is completely released. In the position of valve 21 shown in FIG. 4, device 18 is connected fully to the intake manifold and a full negative pressure is applied to device 18 for complete application of the brakes.

In the position of the parts shown in solid lines in FIG. 2, and wherein the engine has been started and the brakes are fully applied, when accelerator-brake pedal 2 is first pressed downwardly by the toe of the driver, leg *b'* of brake operating lever 11 is moved downwardly by engagement by pin 5. Leg *b* moves upwardly against the force of spring 14 to move valve 21, through lever 13, to the position of FIG. 3. Through the medium of a spring 22 operatively associated with the device 18, rod 19 is projected to move brake pedal 16 to, in turn, position master cylinder 17 to release the brakes. The brake releasing operation continues until pin 5 reaches the end of leg *b'* of lever 11, and the range of operation is indicated at *p* in FIG. 2.

Upon further downward movement of accelerator-brake pedal 2, pin 5 moves onto the idling section 15 extending from the leg *b'*. No further movement of lever 11 takes place while pedal 2 moves through the very small range *q*, this being the neutral range of operation of the pedal. In this range there is no further operation of the brakes and no further operation of the carburetor control, so that the car will move at a relatively low idling speed. The pedal is so arranged so that it will remain in this neutral zone *q* when moved thereinto, so that the operator's foot may be removed from the pedal.

However, when pedal 2 passes through the neutral zone and into the zone r, pin 5 still engages upper edge c of idle section 15 of lever 11 and slides along this upper edge. Since the upper edge is the curved locus of movement of pin 5, as previously mentioned, while pin 5 is moving along this upper edge c, lever 11 for the brake operation is not operated and maintains a position wherein the brake is completely released.

However, as the pedal passes from the neutral zone q into the range or zone r, pin 5 engages leg a' of carburetor operating lever 7 and turns it clockwise to operate the carburetor controls through a connecting rod 8 in the usual manner. Accelerator control of the speed of the vehicle is thus effected while the brake is completely released and while the pin or roller 5 moves along the upper edge c of the idle section 15 of arm b' of brake lever 11. It will thus be seen that the accelerator-brake pedal 2 has three ranges of operation, namely a brake operating range p, a neutral range q and an accelerator operation range r.

In the operation of pedal 2, the leg b' of brake operating lever 11 is automatically raised through the bias of spring 14 at the instant when pedal 2 passes upwardly through the neutral zone q, and it is additionally raised by engagement of roller 6 directly with the leg b'. The changeover from accelerator operation to brake operation is effected by using the heel to press against the rear end of the accelerator-brake pedal.

In the arrangement of the invention, the cooperation with the brake pedal 16 ensures automatically that the braking can be applied to a conventional motor car, and the regular brake pedal 16 may be used when the engine is idle. While the invention has been described as including an automatic brake means operable by the negative pressure in the intake manifold, it will be understood that the operating means for the power braking can be compressed air, if an air compressor is provided in the motor vehicle.

A spring 23 is provided for damping the return motion of pedal 2, being located adjacent the lower and shorter end of the pedal on the opposite side of the pivot 3 for the pedal. This spring is so arranged that, upon movement of pedal 2 from the start of braking, which is the position shown in chain lines in FIG. 2, to the finish of braking, as shown in solid lines in FIG. 2, spring 23 is effective to prevent a jarring stop of the motor car.

According to the present invention, as above-described, the accelerator operation can be performed by the tilting operation of the accelerator-brake pedal and the constitution of the mechanism is simple and not only applicable to the conventional motorcar by a small modification thereto, but also the operations of the accelerator and the brake are performed in respectively independent manner from each other. In addition, the brake works automatically when the foot of the driver is suddenly removed from the pedal without additional operation, and on downgrades the motorcar can be stopped without stepping on the pedal. This invention is therefore very practical and advantageous in preventing accidents that may occur on such occasion.

While a specific embodiment of the invention has been shown and described in detail to illustrate the application of the principles of the invention, it will be understood that the invention may be embodied otherwise without departing from such principles.

What is claimed is:

A combined accelerator and brake pedal control for automotive vehicles having a power actuator connected to a brake controlling foot pedal, and a carburetor, said control comprising, in combination, a single pivotally mounted combined accelerator and braking pedal, a pivotally mounted first lever connected in controlling relation to the power actuator; a pivotally mounted second lever connected in controlling relation to the carburetor; a first projection on said combined accelerator and braking pedal continuously engaged with said first lever; and a second projection on said combined accelerator and braking pedal engageable with said second lever; said combined accelerator and braking pedal having a braking range in which, upon depression of said combined accelerator and braking pedal, said first lever is swung to control the power actuator to release the vehicle brakes, said second projection being disengaged from said second lever in the braking range of said combined accelerator and braking pedal; said combined accelerator and braking pedal having an accelerator range in which said second projection is engaged with said second lever to control the carburetor to control the speed of the vehicle engine; said first lever having a portion of its length engaged by said first projection in the accelerator range of said combined accelerator and braking pedal, and designed as the locus of movement of said first projection whereby, in said accelerator range of said combined accelerator and braking pedal, said first lever remains stationary in its operated position; said combined accelerator and brake pedal having a third projection engaging said first lever, upon movement of said combined accelerator and brake pedal in the decelerating direction, to move said first lever to a position controlling the power actuator to apply the vehicle brakes.

References Cited by the Examiner

UNITED STATES PATENTS

| | | | |
|---|---|---|---|
| 1,447,908 | 3/23 | Staude | 192—3 |
| 2,125,952 | 8/38 | Perry | 192—3 |
| 2,657,777 | 11/53 | Smith | 192—3 |
| 3,101,823 | 8/63 | Flanagan | 192—3 |

DAVID J. WILLIAMOWSKY, *Primary Examiner.*